Figure 1:
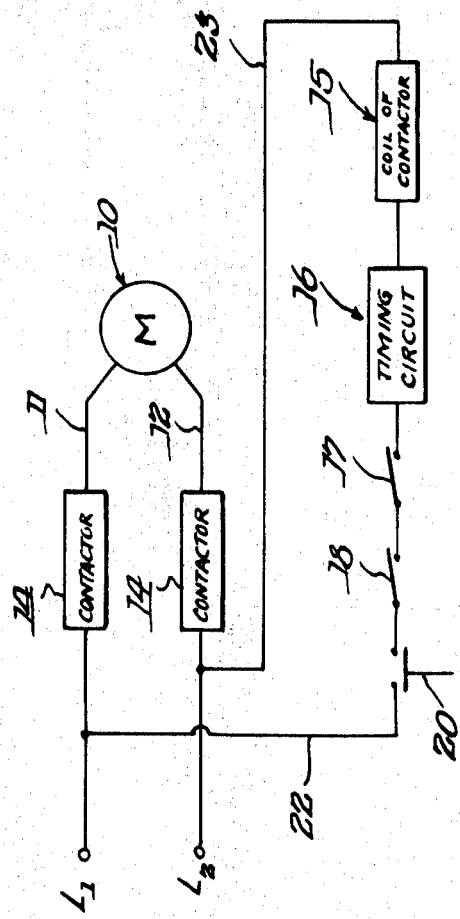

United States Patent

[11] 3,617,815

[72] Inventors Ernie Foldvari
Carpentersville;
Dennis C. Walstad, Winfield, both of Ill.
[21] Appl. No. 858,993
[22] Filed Sept. 18, 1969
[45] Patented Nov. 2, 1971
[73] Assignee Furnas Electric Company
Batavia, Ill.

[54] IMPEDANCE SWITCHING TIMER
3 Claims, 2 Drawing Figs.
[52] U.S. Cl. .................................................. 317/142,
307/132, 307/293, 318/484, 317/36
[51] Int. Cl. ........................................... H01h 47/18
[50] Field of Search ................................. 318/484,
487; 317/22, 36, 141, 142; 307/141, 293, 132

[56] References Cited
UNITED STATES PATENTS
3,182,227 5/1965 Brittain et al. ................. 307/132 X
3,119,951 1/1964 Davy ............................... 317/36 X
3,267,302 8/1966 Breiner et al. ................. 317/141 X
3,312,081 4/1967 Berger et al. .................. 317/22 X
3,422,379 1/1969 Rowell ........................... 317/141 X
3,434,028 3/1969 McCready ..................... 317/36 X

*Primary Examiner*—Oris L. Rader
*Assistant Examiner*—Robert J. Hickey
*Attorney*—Russell H. Clark ABSTRACT: The timing circuit is connected in series relation with the coil of a contactor and the same includes a charging circuit and a conducting circuit. A resistor of high ohmic value and a series connected condenser form the charging circuit. Since the resistor is relatively high in ohms the charging of the condenser is delayed to give the desired time delay interval to the timing circuit. The conducting circuit includes a magnetically actuated reed switch and an inductance coil which is wound around the glass enclosed reed switch. A trigger diode which is caused to close when the condenser is charged to a predetermined voltage effects a discharge of the condenser through the inductance coil.

PATENTED NOV 2 1971

3,617,815

Inventors.
Ernie Foldvari, &
Dennis C. Walstad.

By. Hume, Clement, Hume & Lee
Attys.

IMPEDANCE SWITCHING TIMER

The invention relates to electronic timing circuits for controlling the operation of electric motors and the like and has reference more particularly to an electronic circuit which will present a relatively high impedance preventing current flow for a predetermined time interval and wherein the impedance is reduced to a relatively low value to start current flow and thereafter to maintain current flow.

The timing circuit of the invention is connected in series with certain control switches such as a thermostat, a safety switch and/or a pressure switch and also in series with the coil of the motor contactor. The circuit arrangement is then connected across the terminals of the power supply and in shunt relation with the electric motor or other device to be controlled. When the control switches such as the thermostat, the safety switch and pressure switch are closed, the voltage of the power supply is applied to the timing circuit. However the timing circuit with act as an open switch until a predetermined time interval has elapsed at the end of which current flow takes place to energize the coil of the contactor and with the closing of the contactor the motor or other device is also energized.

An object of the invention resides in the provision of a timing circuit which will have a sufficiently high impedance to form an open circuit preventing current flow when its terminals are connected across a power supply, but wherein the impedance of the circuit will be reduced materially to start current flow and thereafter to maintain current flow.

A more specific object of the invention is to provide an electronic timing circuit wherein a selected value of capacitance in series with a selected value of resistance to control the charging rate of the capacitance will give the desired time interval during which the operation of the motor is delayed following the closing of all the control switches.

Another object is to provide an electric circuit having a built-in timing delay feature and which will also incorporate a capacitor for smoothing the full-wave rectified current and for maintaining minimum current flow when the voltage attains a minimum value at the end of each half wave pulse of the rectified current.

Another object of the invention resides in the provision of an electronic timing circuit which can be preset as regards the time delay interval by selecting certain values of resistance and capacitance and which will also have a fast drop out since the circuit will open immediately in the event of any chattering of the thermostat or other control switch or any momentary interruption in the power supply.

With these and various other objects in view, the invention may consist of certain novel features of construction and operation, as will be more fully described and particularly pointed out in the specification, drawings and claims appended thereto.

Figure 2:
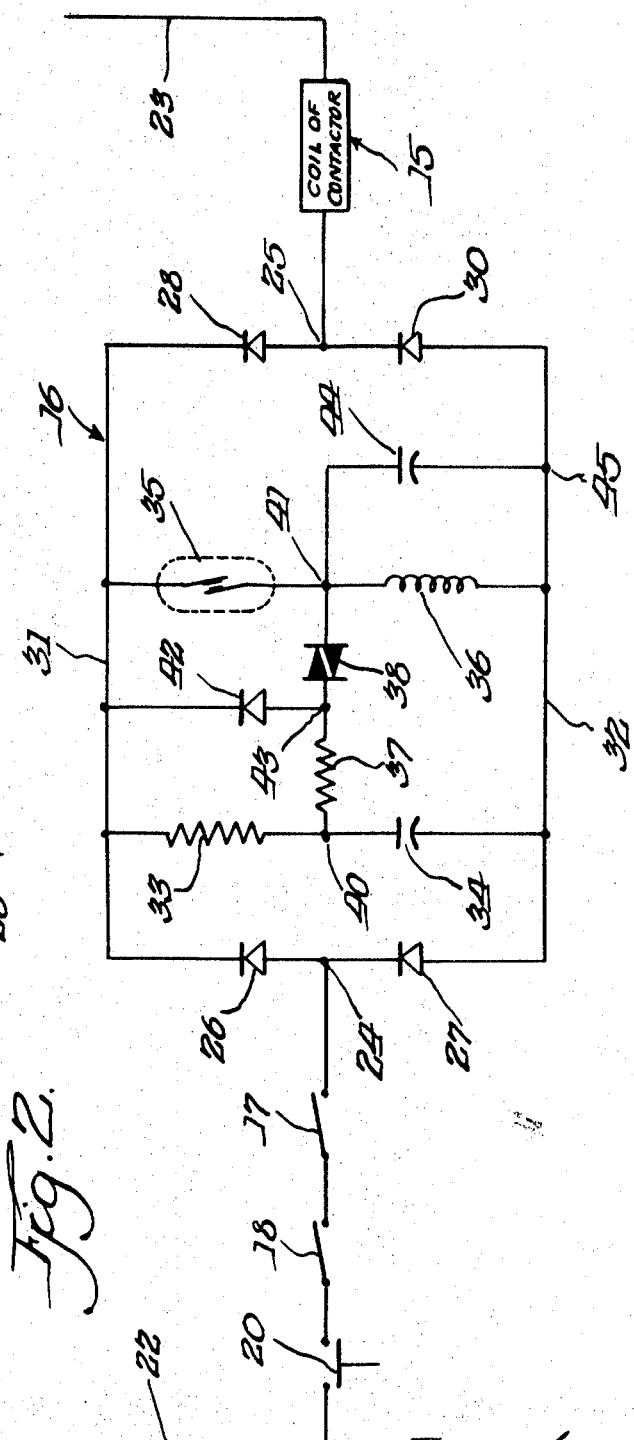

In the drawings which illustrate an embodiment of the device and wherein like reference characters are used to designate like parts:

FIG. 1 is a diagrammatic view of a control circuit arrangement for an electric motor and which incorporates the timing circuit of the invention; and FIG. 2 is a diagrammatic view of the timing circuit showing the same in series with several control switches and in series with the coil of the motor contactor.

The diagrammatic circuit arrangement shown in FIG. 1 illustrates an important and extensive use of the present timing circuit, namely as protection for an electric motor such as 10. The motor may be a compressor motor such as may be used in air conditioning equipment and the conductors 11 and 12 electrically connect the motor to the leads $L_1$ and $L_2$ of a source of alternating current. Switching means in the form of a motor contactor 14 is interposed in the conductors 11 and 12 and the coil of said contactor indicated by the numeral 15 is connected across the power source in shunt relation with the motor 10.

The numeral 16 indicates the timing circuit in its entirety and said timing circuit is in series relation with the coil 15. The circuit and said coil are also connected in series with certain control switches such as the thermostatic switch 17, the safety switch 18 and the pressure switch 20. In the event the incoming power supply is momentarily interrupted due to lightning or other reasons for more than 15 or 20 milliseconds, the timing circuit will open to deenergize the contactor coil, and current flow to the compressor motor is thus terminated. After a preset time delay on the order of several minutes the timing device will restore current flow provided the control switches remain closed. Similar operation takes place in the event of thermostat chatter such as may interrupt current flow to the timing circuit for more than 15 or 20 milliseconds. The reset time after deenergization under any condition is a matter of minutes depending on the values of the components employed in timing circuit. The device will then automatically reset and complete the control circuit to again energize the coil 15 of the contactor 14. This reset time protects the motor from short cycling since reset does not occur before a lapse of 2 or 3 minutes.

Referring to FIG. 2 which illustrates in diagrammatic form the details of the timing circuit, it will be seen that the conductors 22 and 23 connect at the terminals 24 and 25 with the respective sides of a diode bridge for full wave rectification of the alternating current obtained from $L_1 - L_2$. Terminal 24 has connection with the rectifiers 26 and 27 whereas terminal 25 connects with the rectifiers 28 and 30. The conductor 31 is thus the positive side of the bridge with the conductor 32 forming the negative side. The resistance 33 and the capacitor 34 are connected in series across the conductors 31 and 32. The resistance 33 is relatively high in value on the order of 1.5 megohms although its resistance in ohms will vary depending on the time delay desired. The capacitor 34 designed for about 75 volts will have a value of approximately 200 microfarads. However, here again the selection will depend on the time delay interval desired for the circuit. The reed switch 35 and the coil 36 are also connected in series with each other and across the conductors 31 and 32. The coil 36 is physically wound around the glass enclosed reed switch so that the magnetic flux caused by current flow through the coil will cause the contacts of the reed switch to close.

The resistance 37 and the trigger diode or diac 38 are joined in series and the same are connected at one end 40 between the resistance 33 and the capacitor 34 and at the opposite end the same are connected at 41 between reed switch 35 and the coil 36. The diode 42 is connected at 43 between the resistance 37 and the diac 38 and at its opposite end the diode is joined to the conductor 31. Another connection leading from 41 includes the capacitor 44 which is connected at 45 with the negative conductor 32. The value of resistor 37 is relatively low on the order of 100 ohms. The diac 38 is a switching device sensitive to voltage, and when approximately 60 volts, as regards the circuit of FIG. 2, are applied thereto the diac is caused to close. The capacitor 44 is designed for about 20-volt operation and has a value of approximately 60 microfarads.

It is believed that operation of the timing circuit will be clear and fully understood from the description of the various components. However, it can be stated that current flow taking place through resistance 33 will charge the condenser 34. However, the charging time is slow due to the high value in ohms of the resistor 33 which gives the time delay in minutes such as may be desired. The condenser 34 will discharge through the resistance 37 when the voltage across the diac reaches approximately 60 volts, the diac having been selected for such closing at the stated voltage. The discharge current will thus flow through the coil 36 and the resulting flux will cause the reed switch to close. With the closing of the reed switch the impedance of the timing circuit is materially reduced since the current now bypass the high ohm resistor 33 and flows through the reed switch and the coil which have a relatively low impedance. The condenser 44 is connected across the coil 36 in order to smooth out the pulses of the full-wave rectified current and maintain current flow through the coil even when the half-wave pulses attain a minimum or zero voltage. It is necessary to maintain current flow through the coil 36 or else the reed switch would inadvertently open. The diode 42 is provided so as to allow the capacitor 34 to fully discharge. Otherwise the next operation might possibly take place with 34 partly charged which would shorten the time delay interval.

In the event the control switches 17, 18 and 20 should open or in the event the supply current should be interrupted, then the current flow in the coil will cease and the reed switch will immediately open. Accordingly it will be understood that the present timing circuit has a fast dropout. Also, even though voltage is immediately applied to the terminals 24 and 25 of the timing circuit, the coil 15 of the contactor will not be energized until the time delay period for the timer has elapsed. In other words, the timing circuit does not reset itself following deenergization of the contactor coil until the delay time interval for the circuit has elapsed. This reset time helps to protect the motor from short cycling by preventing the motor from starting up until a delay of 2 or 3 minutes after the motor has stopped for any reason. This is particularly advantageous for hermetic compressor motors which are often unable to restart until the head pressure of refrigerant gas has been dissipated through the expansion valve.

The timing circuit is connected across the motor terminals in advance of the contactor and upon closing of the control switches the rectified voltage is immediately applied to cause charging of the condenser 34 at the rate determined by the resistance value of 33. This charging circuit as the same may be termed is in parallel with the conducting circuit including the reed switch 35 and the inductance coil 36. The trip circuit consists of the trigger diode or diac 38 which is sensitive to voltage. Accordingly when the condenser 34 has been charged to a value as determined by the diac, the same is caused to close and the condenser 34 discharges through the coil 36.

What is claimed is:

1. In a timing circuit of the character described, the combination with a source of alternating current, of a diode bridge circuit for full-wave rectification having its terminals connected across the current source, a charging circuit consisting of a high ohmic value resistor in series relation with a first condenser, the resistor being connected to the positive terminal of the bridge and the condenser being connected to the negative terminal of the bridge. A parallel conducting circuit consisting of a magnetically actuated reed switch in series connected relation with an inductance coil, the reed switch being connected to said positive terminal and the coil being connected to the negative terminal of the bridge circuit, said coil having inductive relation with the reed switch whereby the reed switch is caused to close when current flows through the coil, a trip circuit including a trigger diode which is caused to close when a preselected voltage is applied to its terminals, a conductor connecting the trigger diode to the charging circuit between the resistor and the first condenser and to the conducting circuit between the reed switch and the inductance coil, whereby when the first condenser is charged to the preselected voltage the diode closes to discharge the first condenser through the inductance coil, a second condenser connected across the inductance coil for smoothing out the current flow as rectified by the bridge and a diode having one side thereof electrically connected to said conductor at a location between the trigger diode and its connection to the charging circuit and having its other side connected to the positive terminal of the bridge circuit, whereby the first condenser may fully discharge before another charging of said condenser begins to take place.

2. In a timing circuit having terminals connected across a source of electric current, in combination, a first resistor and a first condenser, said first resistor having electrical connection to one terminal and having a series connected relation with the first condenser which is connected to the other terminal, said resistor having a relatively high resistance value so as to cause the condenser to charge at a relatively slow preselected rate, first switch means of the sensitive-to-voltage type and having such connection with the first resistor-first condenser series circuit that the first condenser upon discharge will cause current to flow through the said first switch means, an inductance coil and second switch means in series connected relation, the inductance coil having electrical connection to one terminal and the second switch means being connected to the other terminal of the timing circuit, said second switch means being glass enclosed and of the magnetically actuated type and the inductance coil having an inductive relation therewith, said coil and second switch means having such electrical connection with the first switch means of the sensitive-to-voltage type that upon current flow taking place through the same the said current is caused to also flow through the inductance coil, whereby the second switch means is caused to close due to the magnetic action of the inductance coil on the second switch means when current flows through the inductance coil, said second switch means when closed together with the inductance coil providing a path for current flow of considerably less impedance than the path provided by the first resistor of high ohmic value and its series connected first condenser, a second condenser connected across the inductance coil for maintaining current flow through the coil for as long as the second switch means remains closed, and a diode having one side thereof electrically connected in circuit between said first switch means of the sensitive-to-voltage type and the connection thereof to the first resistor-first condenser series circuit and having its other side connected to the positive terminal of the timing circuit, whereby the first condenser may fully discharge before another charging of said condenser starts to take place.

3. A timing circuit having terminals connected across a source of electric current as defined by claim 2, wherein the first switch means of the sensitive-to-voltage type consists of a diac which provides a normally open switch, wherein its connection in the timing circuit is such that the diac is caused to close when the first condenser has been charged to a preselected value, and wherein with the closing of the diac the first condenser discharges through the same.

* * * * *